(12) United States Patent
Fleischer et al.

(10) Patent No.: US 9,841,926 B2
(45) Date of Patent: *Dec. 12, 2017

(54) ON-CHIP TRAFFIC PRIORITIZATION IN MEMORY

(71) Applicant: International Business Machines Corporation, Armonk, NY (US)

(72) Inventors: Bruce M. Fleischer, Bedford Hills, NY (US); Thomas W. Fox, Hopewell Junction, NY (US); Hans M. Jacobson, White Plains, NY (US); Ravi Nair, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/198,868

(22) Filed: Jun. 30, 2016

(65) Prior Publication Data

US 2016/0313947 A1    Oct. 27, 2016

Related U.S. Application Data

(63) Continuation of application No. 13/737,339, filed on Jan. 9, 2013, now Pat. No. 9,405,711.

(51) Int. Cl.
*G06F 12/00* (2006.01)
*G06F 3/06* (2006.01)
(Continued)

(52) U.S. Cl.
CPC ............ *G06F 3/0659* (2013.01); *G06F 3/061* (2013.01); *G06F 3/0625* (2013.01);
(Continued)

(58) Field of Classification Search
CPC .................. G06F 12/0815; G06F 12/0831
See application file for complete search history.

(56) References Cited

U.S. PATENT DOCUMENTS 6,449,702 B1   9/2002   Witter et al.
8,234,478 B1   7/2012   Roberts et al.
(Continued)

OTHER PUBLICATIONS

H. Zheng, et al., "Memory Access Scheduling Schemes for Systems with Multi-Core Processors," IEEE 2008, pp. 406-413.

*Primary Examiner* — David X Yi
*Assistant Examiner* — Arvind Talukdar
(74) *Attorney, Agent, or Firm* — Cantor Colburn LLP

(57) ABSTRACT

According to one embodiment, a method for traffic prioritization in a memory device includes sending a memory access request including a priority value from a processing element in the memory device to a crossbar interconnect in the memory device. The memory access request is routed through the crossbar interconnect to a memory controller in the memory device associated with the memory access request. The memory access request is received at the memory controller. The priority value of the memory access request is compared to priority values of a plurality of memory access requests stored in a queue of the memory controller to determine a highest priority memory access request. A next memory access request is performed by the memory controller based on the highest priority memory access request.

20 Claims, 4 Drawing Sheets

(51) Int. Cl.
*G06F 13/18* (2006.01)
*G06F 13/16* (2006.01)
*G06F 9/48* (2006.01)

(52) U.S. Cl.
CPC ........ *G06F 3/0673* (2013.01); *G06F 13/1626* (2013.01); *G06F 13/1663* (2013.01); *G06F 13/18* (2013.01); *G06F 9/4881* (2013.01); *Y02B 60/1228* (2013.01)

(56) References Cited

U.S. PATENT DOCUMENTS

| | | |
|---|---|---|
| 2005/0060457 A1 * | 3/2005 | Olukotun ............ G06F 9/3851 710/240 |
| 2005/0278520 A1 | 12/2005 | Hirai et al. |
| 2008/0184246 A1 | 7/2008 | Accapadi et al. |
| 2010/0031006 A1 | 2/2010 | El-Essawy et al. |
| 2011/0202813 A1 | 8/2011 | Resnick |
| 2011/0296149 A1 | 12/2011 | Carter et al. |
| 2012/0054760 A1 | 3/2012 | Chung |
| 2013/0111175 A1 | 5/2013 | Mogul et al. |
| 2014/0095691 A1 | 4/2014 | Ganguli et al. |
| 2014/0129744 A1 | 5/2014 | Muppirala et al. |
| 2015/0019731 A1 | 1/2015 | Abts |

* cited by examiner

continued on next page …

ON-CHIP TRAFFIC PRIORITIZATION IN MEMORY

CROSS-REFERENCE TO RELATED APPLICATIONS

This is a continuation application of U.S. patent application Ser. No. 13/737,339, filed Jan. 9, 2013, the contents of which are incorporated by reference herein in their entirety.

BACKGROUND

The present invention relates to computer memory, and more particularly to traffic prioritization within a memory device.

Computer systems often require a considerable amount of high speed memory, such as random access memory (RAM), to hold information, such as data and programs, when a computer is powered and operational. Memory device demands have continued to grow as computer systems have increased in performance and complexity.

Communication from a main processor to locations on memory devices can involve relatively long data access times and latency. The time it takes for the main processor to access memory can be, for example, several hundred cycles, including time to realize the data is not in cache (for memory reads), time to traverse from a processor core of the main processor to I/O, across a module or other packaging, arbitration time to establish a channel to memory in a multi-processor/shared memory system, and time to get the data into or out of a memory cell. Contention between multiple resources attempting to access shared memory at the same time adds to system latency and power requirements.

SUMMARY

According to one embodiment, a method for traffic prioritization in a memory device includes sending a memory access request including a priority value from a processing element in the memory device to a crossbar interconnect in the memory device. The memory access request is routed through the crossbar interconnect to a memory controller in the memory device associated with the memory access request. The memory access request is received at the memory controller. The priority value of the memory access request is compared to priority values of a plurality of memory access requests stored in a queue of the memory controller to determine a highest priority memory access request. A next memory access request is performed by the memory controller based on the highest priority memory access request.

Additional exemplary embodiments include a method for traffic prioritization in a memory system. The method includes sending a memory access request, including a priority value, from a processing element to the crossbar interconnect in a memory device. The memory access request is routed through the crossbar interconnect to a memory controller in the memory device associated with the memory access request. The memory access request is received at the memory controller to access memory in a vault of stacked memory chips controlled by the memory controller. The priority value of the memory access request is compared to priority values of a plurality of memory access requests stored in a queue of the memory controller to determine a highest priority memory access request. The plurality of memory access requests are from the processing element and one or more other processing elements. A next memory access request is performed based on the highest priority memory access request.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
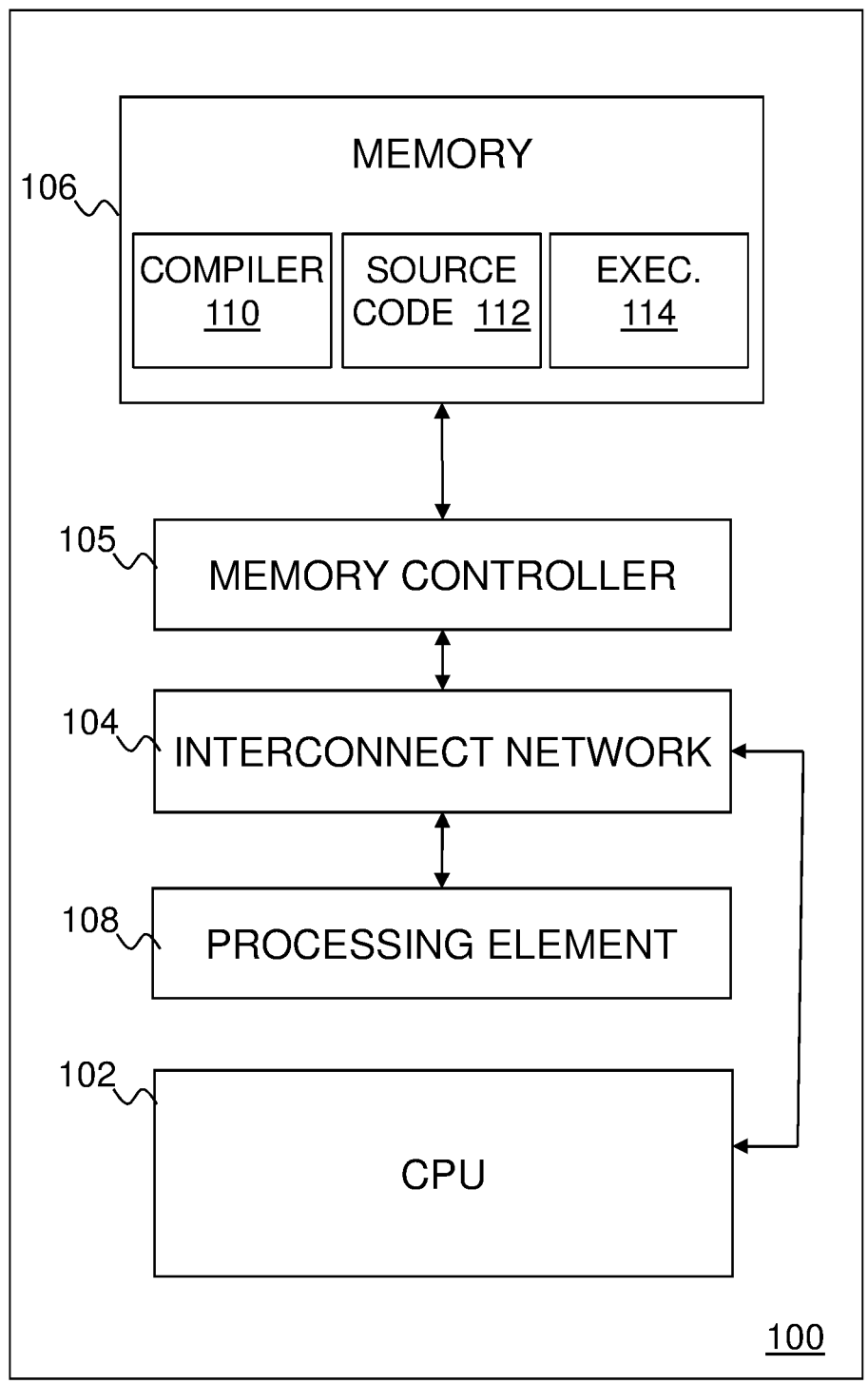
FIG. 1 illustrates a block diagram of a computer system in accordance with an embodiment.

An embodiment is directed to a computer system with a main processor and one or more active memory devices having on-chip traffic prioritization. Power and latency in memory are important factors affecting system performance and energy. In exemplary embodiments, prioritization of memory traffic reduces bandwidth contention and power to improve system performance. Each active memory device can include an on-chip network of crossbar interconnect switches to connect a number of links from a main processor, multiple processing elements, and multiple memory controllers. A number of features can be utilized to enhance memory traffic prioritization. The traffic prioritization can be managed in a distributed fashion by locally setting priority at the source of each memory access request through hardware or software indications of criticality and progress, or in a centralized fashion through an on-chip progress monitor to globally control progress. Traffic prioritization management can be implemented in the processing elements, in the crossbar interconnect, and/or in the memory controllers.

In embodiments, the processing elements are capable of performing a variety of tasks, such as arithmetic operations, loads, stores and decrements. Each processing element can perform a sequence of instructions loaded into a lane instruction buffer to offload the main processor in performing operations upon data accessed in the active memory devices. Multiple processing elements can access memory within each memory device.

In an embodiment, each active memory device includes layers of memory that form a three dimensional ("3D") memory device where individual columns of memory chips form stacks or vaults in communication with a memory controller. In one embodiment, a plurality of memory vaults is located on an active memory device, where each vault has a respective memory controller. The stacks may also include a processing element configured to communicate with the memory and other processing elements in the active memory device. In other embodiments, processing elements are physically separated from the memory stacks but are still part of the active memory device, where the processing elements are pooled and available to perform instructions using any of the memory stacks within the device. In an embodiment, a processing element accesses a selected address in a vault through a crossbar interconnect of switches and a memory controller. In one embodiment, a plurality of memory devices, stacks and processing elements may communicate via an interconnect network formed by coupling multiple crossbar interconnects. In embodiments, a memory stack includes multiple dynamic random access memory (DRAM) dies stacked together, where each DRAM die is divided into a number of banks. Further, in the example, a group of banks in each die, vertically aligned, may be referred to as a vault accessed by a vault controller or memory controller.

Embodiments include a plurality of memory vaults with memory controllers and processing elements, referred to as an active memory device. The active memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising a lane instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the processing element are address translation capabilities for converting or translating virtual addresses to physical addresses, a unified load/store queue to sequence data movement between the memory and the processing element, and a processor communications unit, for communication with the main processor.

FIG. 1 illustrates a block diagram of a computer system including one or more active memory devices having on-chip traffic prioritization in accordance with an embodiment. A computer system 100 depicted in FIG. 1 includes a computer processor 102, a memory 106, an interconnect network 104 including a crossbar interconnect of switches, a memory controller 105, and processing element 108.

In one embodiment, the memory 106 and memory controller 105 are coupled to the computer processor 102 via the interconnect network 104. Processes executing on the computer processor 102 can issue memory access requests through the interconnect network 104 or provide instructions to the processing element 108 that result in memory access requests. In one example, a write request contains data to be written to the memory 106 and the real address identifying the location in the memory 106 where the data will be written.

In an embodiment, a command sent from the computer processor 102 through the interconnect network 104 to the processing element 108 specifies a sequence of instructions that include setup actions, execution actions and notification of completion actions. The setup actions may include configuration actions such as a command that loads configuration information from the memory 106 directly into the processing element 108. By providing the configuration information in the memory 106, the processing element 108 is able to be properly configured after receiving a command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). The setup actions may also include the loading of code, such as a sequence of instructions, from the memory 106 into the processing element 108. The execution actions include execution of the code that includes load, store, arithmetic/logical and other instructions.

In an additional mode of an embodiment, the processing element 108 is coupled to the main processor or computer processor 102 through the interconnect network 104 and receives a command from the computer processor 102. The command corresponds to instructions stored in the memory to access and perform operations on the memory 106. In the embodiment, the instruction(s) executes and forms the virtual address corresponding to a location in memory 106. The memory controller 105 and/or processing element 108 stores data at a real address within the memory 106. In an embodiment, the processing element 108 maps the virtual address to a real address in the memory 106 when storing or retrieving data. The computer processor 102 provides commands to the memory 106, where the processing element 108 receives the command and fetches corresponding instructions from the memory 106. In an embodiment, the processing element 108 receives a task as part of the command, where a part of the task may be sent back to the computer processor 102 for execution. The computer processor 102 may be better suited to execute functions specified by the task due to several factors, such as data location and support for the functions. In an embodiment, the memory 106, memory controller 105, the interconnect network 104, and processing element 108 are combined into a single device, such as an active memory device, in communication with the main processor 102.

The system 100 is one example of a configuration that may be utilized to perform the processing described herein. Although the system 100 has been depicted with only a single memory 106, memory controller 105, interconnect network 104, processing element 108, and computer processor 102, it will be understood that other embodiments would also operate in other systems with two or more of the memory 106, memory controller 105, processing element 108 or computer processor 102. In an embodiment, the memory 106, memory controller 105, interconnect network 104, processing element 108, and computer processor 102 are not located within the same computer. For example, the memory 106, processing element 108 and memory controller 105 may be located in one physical location (e.g., on a memory module) while the computer processor 102 is located in another physical location (e.g., the computer processor 102 accesses the memory controller 105 via the interconnect network 104 or other network). In addition, portions of the processing described herein may span one or more of the memory 106, memory controller 105, interconnect network 104, processing element 108, and computer processor 102.

The memory 106 may store one or more separate programs, each of which comprises an ordered listing of executable instructions for implementing logical functions. For example, software stored in the memory 106 may include an operating system (not shown), source code 112, and one or more applications. As shown in FIG. 1, the memory 106 stores source code 112 and a compiler 110. The compiler 110 may alternatively be stored and executed on a system that is external to the system 100 for which it produces executable programs, such as executable 114. The compiler 110 includes numerous functional components for implementing one or more features, processes, methods, functions, and operations of the exemplary embodiments, as will be described further herein. In an embodiment, the compiler 110 compiles and links the source code 112 into the executable 114 to be executed within the processing element 108. To improve traffic prioritization, the compiler 110 can be configured to determine load-to-use distances between loading and using data associated with memory access requests from the processing element 108 when generating the executable 114 for the processing element 108. The compiler 110 can set a load-to-use distance hint in executable instructions of the executable 114 for the processing element 108. Slack identified based on the load-to-use distance can result in formatting a memory access request as a lower power non-speculative request using a request-grant protocol for a larger load-to-use distance or a higher power speculative request for a smaller load-to-use distance.

Figure 2:
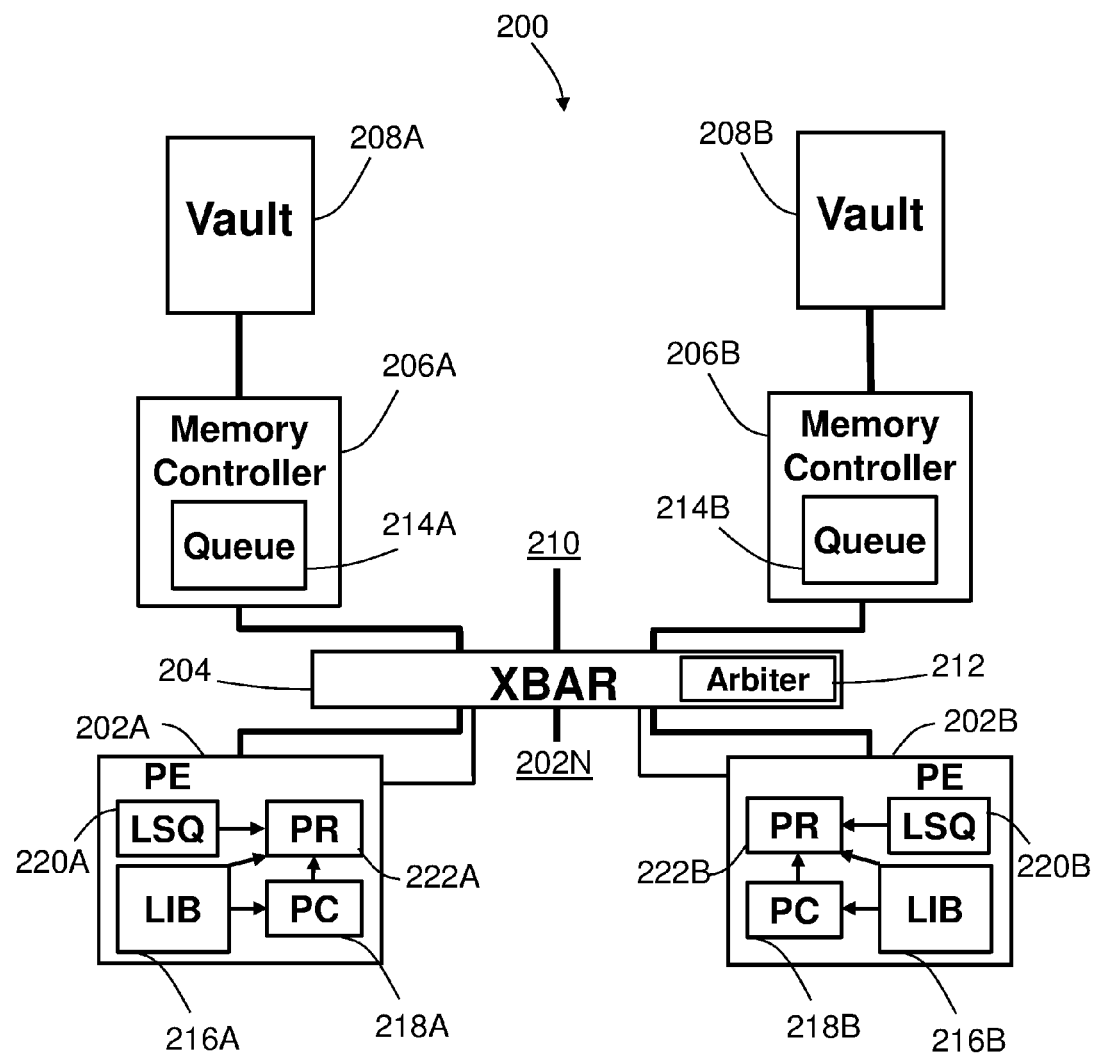
FIG. 2 illustrates a block diagram of a memory device in accordance with an embodiment.

FIG. 2 is a block diagram of a memory device 200 according to an embodiment. In one embodiment, the memory device 200 is an active memory device that includes a processing elements 202A and 202B (referred to generally as processing element or elements 202) coupled to a crossbar interconnect 204. The memory device 200 also includes memory controllers 206A and 206B (referred to generally as memory controller or controllers 206) coupled to the crossbar interconnect 204, and to memory vaults 208A and 208B (referred to generally as memory vault or vaults 208) respectively. The memory device 200 can also include one or more additional processing elements 202N coupled to the crossbar interconnect 204. One or more additional elements 210 can also be coupled to the crossbar interconnect 204, such as additional sets of memory controllers 206, memory vaults 208, and a main processor such as computer processor 102 of FIG. 1. The memory vaults 208A and 208B can each include multiple layers of stacked addressable memory elements arranged in three-dimensional blocked regions that are independently accessible in parallel.

The crossbar interconnect 204 provides a fast and high bandwidth path for communication between portions of the memory device 200 using a network of switches (not depicted). The crossbar interconnect 204 includes an arbiter 212 that is configured to receive memory access requests. The memory access requests can each include a routing tag and priority value. The arbiter 212 arbitrates between memory access requests based on comparing priority values of the memory access requests relative to each other. The arbiter 212 can support a request-grant protocol for non-speculative requests, where the arbiter 212 receives a scheduling request and responds with a scheduling slot indicating when a requesting resource (e.g., a processing element 202) will be granted access to pass communications through the crossbar interconnect 204. The arbiter 212 can also support a speculative request protocol. If a speculative request is received at the arbiter 212 and a path through the crossbar interconnect 204 is available, the speculative request can be granted immediately; otherwise, the speculative request may be denied. Requests that are denied by the arbiter 212 may be queued locally to retry or the requesting resource may be responsible for resending the request.

Memory access requests that are successfully routed through the crossbar interconnect 204 are collected in queues 214 of the memory controllers 206. Each memory controller 206 may have a separate queue 214 to store memory access requests for its respective vault 208. For example, memory controller 206A includes queue 214A to buffer memory access requests to vault 208A of stacked memory chips controlled by memory controller 206A, and memory controller 206B includes queue 214B to buffer memory access requests to vault 208B of stacked memory chips controlled by memory controller 206B.

Each processing element 202 includes features to support traffic prioritization. For example, processing element 202A includes a lane instruction buffer 216A, a progress counter 218A, a load-store queue 220A, and a memory request priority register 222A. Similarly, processing element 202B includes a lane instruction buffer 216B, a progress counter 218B, a load-store queue 220B, and a memory request priority register 222B. The lane instruction buffers 216A and 216B include a sequence of instructions for each of the processing elements 202A and 202B to execute, such as portions of the executable 114 of FIG. 1.

Each of the processing elements 202A and 202B may advance through instructions at a different rate. As execution checkpoints are reached or a predetermined number of instructions are executed, each of the processing elements 202A and 202B can update their respective progress counters 218A and 218B. Changes in the progress counters 218A and 218B can result in changes in the memory request priority registers 222A and 222B. For example, a lower progress indication in progress counters 218A and 218B can result in a higher priority value in the memory request priority registers 222A and 222B, while a higher progress indication in the progress counters 218A and 218B can result in a lower priority value in the memory request priority registers 222A and 222B to give preference to a processing element 202 that is slower in advancing through the instructions.

The memory request priority registers 222A and 222B can be adjusted based on a load-store queue depth relative to a load-store queue capacity of load-store queues 220A and 220B, where the load-store queues 220A and 220B buffer a sequence of memory access requests and data sent between the processing elements 202 and the memory controllers 206. The memory request priority registers 222A and 222B may also be adjusted based on application code or compiler hints indicating criticality of a code section or load-to-use distance of memory access requests in instructions in the instruction buffers 216A and 216B.

While FIG. 2 depicts only two processing elements 202A and 202B, memory controllers 206A and 206 B, and memory vaults 208A and 208B in the memory device 200, the number of elements in the memory device 200 can vary. In one example, the number of processing elements 202 may be greater than the number of memory vaults 208. In another embodiment, the memory device 200 may include fewer processing elements 202 than memory vaults 208. In embodiments, the processing elements 202 are pooled and available to access any memory vault 208 in the memory device 200. For example, the memory device 200 may include sixteen memory vaults 208 and memory controllers 206, but only eight processing elements 202. The eight processing elements 202 are pooled, and utilized as resources for accessing any memory vaults 208 coupled to the crossbar interconnect 204. In another example, a memory device may be passive, where the memory device is controlled by external requestors, like computer processor 102 of FIG. 1, coupled to the crossbar interconnect 204.

Figure 3:
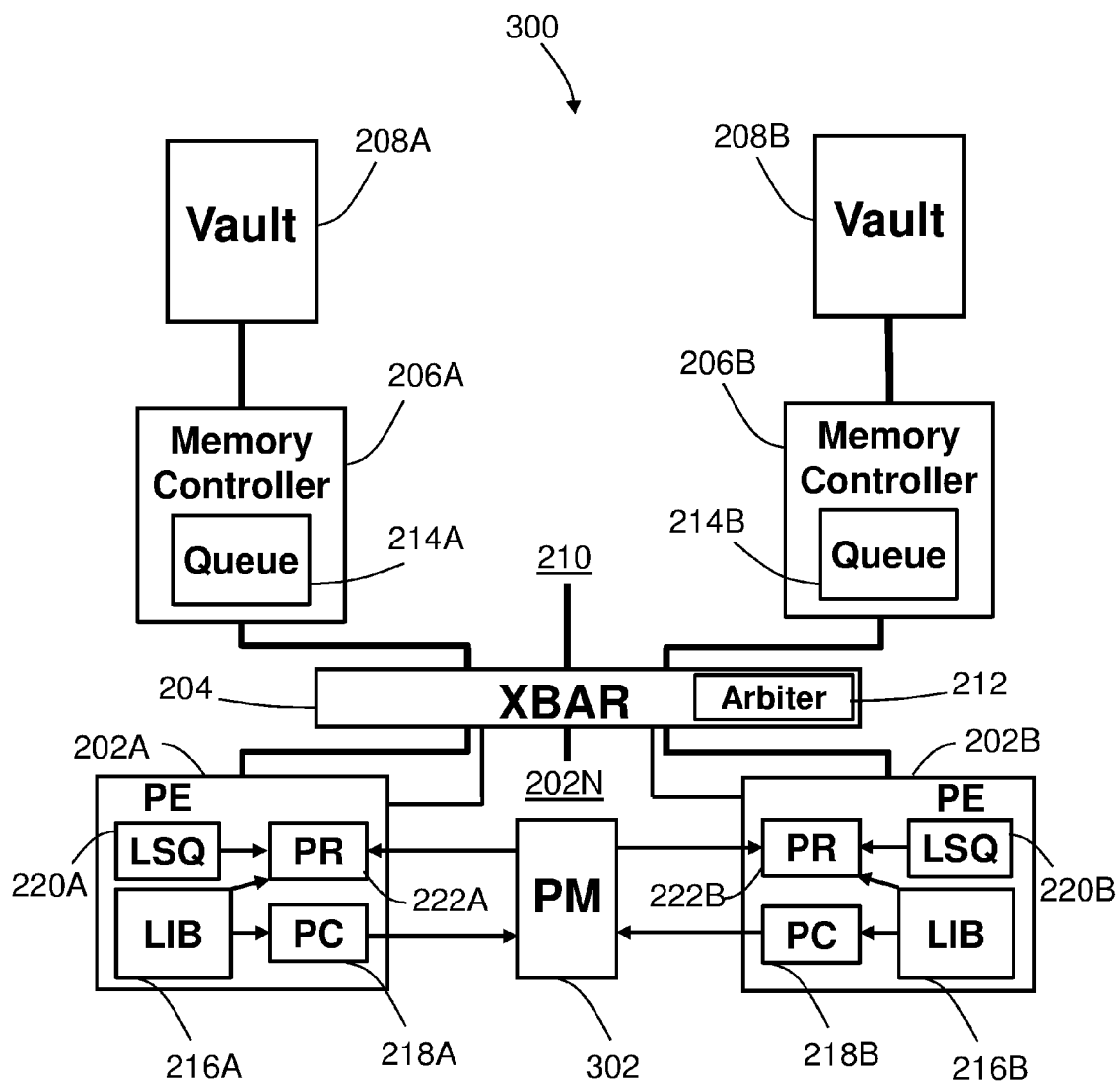
FIG. 3 illustrates a block diagram of a memory device in accordance with an alternate embodiment.

FIG. 3 illustrates a block diagram of a memory device 300 in accordance with an alternate embodiment. Like the memory device 200 of FIG. 2, the memory device 300 of FIG. 3 is an active memory device that includes processing elements 202A, and 202B, one or more additional processing elements 202N, crossbar interconnect 204, memory controllers 206A and 206B coupled to memory vaults 208A and 208B, one or more additional elements 210, arbiter 212, queues 214A and 214B, lane instruction buffers 216A and 216B, progress counters 218A and 218B, load-store queues 220A and 220B, and memory request priority registers 222A and 222B. Additionally, the memory device 300 also includes a progress monitor 302 for global traffic prioritization.

The progress monitor 302 receives progress counter values of the progress counters 218A and 218B, as well as progress counter values from any other progress counters 218 in the memory device 300. The progress monitor 302 compares the progress counter values and adjusts the memory request priority registers 222A and 222B, as well as any other memory request priority registers 222 in the memory device 300 to increase priority for processing elements 202 having lesser progress and decrease priority for processing elements 202 having greater progress. Adjusting the memory request priority registers 222 globally can result in reducing power for tasks that are running ahead and provide lower latency for tasks that are falling behind to balance overall progress within the memory device 300.

Figure 4:
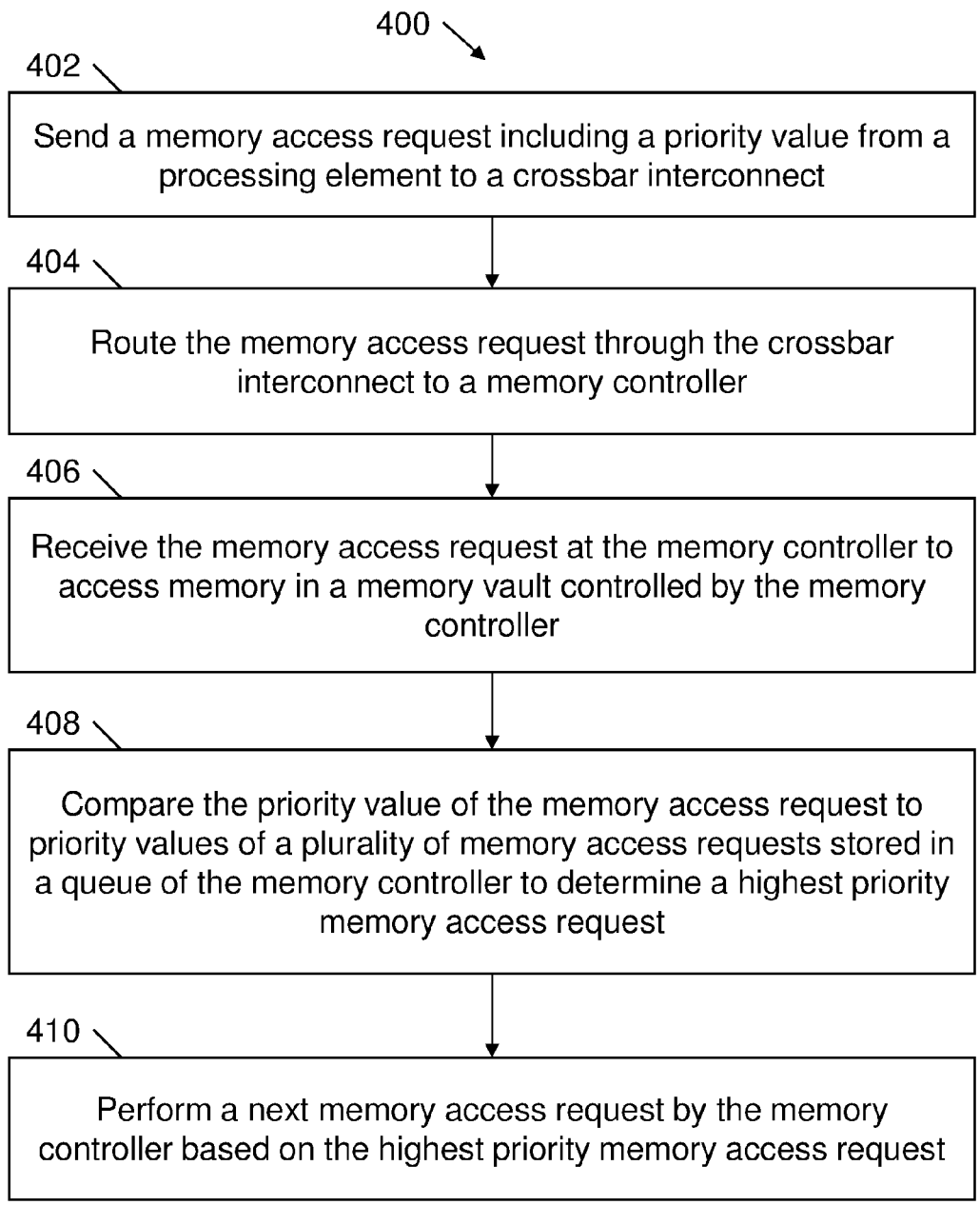
FIG. 4 illustrates a flow diagram of a method for traffic prioritization in a memory device in accordance with an embodiment.

FIG. 4 is a flow chart 400 of an exemplary process for memory traffic prioritization, such as in the system 100 and memory devices 200 and 300 of FIGS. 1-3. At block 402, a memory access request, including a priority value, is sent from a processing element 202 to a crossbar interconnect 204 in a memory device, such as memory device 200 or 300. The priority value is set based on a memory request priority register 222 in the processing element 202.

At block 404, the memory access request is routed through the crossbar interconnect 204 to a memory controller 206 in the memory device associated with the memory access request. The memory access request and one or more other memory access requests can be received at the crossbar interconnect 204. The arbiter 212 arbitrates between the memory access request and the one or more other memory access requests in the crossbar interconnect 204 based on comparing the priority value of the memory access request relative to one or more priority values of the one or more other memory access requests.

At block 406, the memory access request is received at the memory controller 206 to access memory in a vault 208 of stacked memory chips controlled by the memory controller 206. At block 408, the memory controller 206 compares the priority value of the memory access request to priority values of a plurality of memory access requests stored in a queue 214 of the memory controller 206 to determine a highest priority memory access request, where the plurality of memory access requests are from the processing element 202 and one or more other processing elements.

At block 410, the memory controller 206 performs a next memory access request based on the highest priority memory access request. The memory controller 206 may adjust the priority of memory access requests in the queue 214. For example, the memory controller 206 may receive an indication that the load-store queue 220 has reached a threshold level of the load-store queue depth relative to the load-store queue capacity and increase priority values of memory access requests in the queue 214 from the processing element 202 based on the indication. The memory controller 206 may also adjust the priority values of the plurality of memory access requests stored in the queue 214 based on one or more of: a number of memory access requests in the queue 214 from a same processing element 202; a latest priority of a last arriving memory access request from the same processing element 202; and an age of the memory access requests in the queue 214.

The memory request priority register 222 can be adjusted based on a variety of factors to dynamically modify priority for memory access requests. For example, the memory request priority register 222 can be adjusted based on an application code hint indicating criticality of a code section. The memory request priority register 222 can also be adjusted based on a load-to-use distance hint from the compiler 110, where a larger load-to-use distance is associated with a lower priority and a smaller load-to-use distance is associated with a higher priority. The memory access request may be handled as a non-speculative request based on a lower priority value and as a speculative request based on a higher priority value. The memory request priority register 222 can also be adjusted based on a load-store queue depth relative to a load-store queue capacity of a load-store queue 220 in the processing element 202. The memory request priority register 222 may also be adjusted based on the value of the progress counter 218, where the progress counter 218 is updated based on a relative number of instructions executed in the processing element 202. Adjustments to the memory request priority register 222 based on the progress counter 218 can be managed locally by the processing element 202 or globally by the progress monitor 302.

Technical effects include reduced latency and power while balancing computation in processing elements of a memory device accessing shared memory vaults through memory controllers and a crossbar interconnect.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for traffic prioritization in a memory device, the method comprising:
   sending a first memory access request comprising a first priority value from a processing element in the memory device to a crossbar interconnect in the memory device;
   routing the first memory access request through the crossbar interconnect to a memory controller in the memory device associated with the first memory access request;
   receiving the first memory access request at the memory controller;
   determining a first load-to-use distance associated with the first memory access request, wherein the first load-to-use distance is indicative of a first time that elapses between loading and using data associated with the first memory access request;
   determining a second load-to-use distance associated with a second memory access request of a plurality of memory access requests stored in a queue of the memory controller, wherein the second load-to-use distance is indicative of a second time that elapses between loading and using data associated with the second memory access request, wherein each of the plurality of memory access requests stored in the queue is associated with a corresponding priority value of a set of priority values, and wherein the set of priority values is indicative of an order of execution of the plurality of memory access requests;

determining that the second load-to-use distance is greater than the first load-to-use distance indicating that the second time is greater than the first time;

dynamically modifying a second priority value of the second memory access request based at least in part on determining that the second load-to-use distance is greater than the first load-to-use distance, wherein dynamically modifying the second priority value comprises lowering the second priority value to decrease a priority of the second memory access request in the order of execution;

comparing the first priority value of the first memory access request to the set of priority values to determine a highest priority memory access request; and performing, by the memory controller, the highest priority memory access request.

2. The method of claim 1, further comprising:
setting the first priority value based on a memory request priority register in the processing element.

3. The method of claim 2, further comprising:
adjusting the memory request priority register based on an application code hint indicating criticality of a code section.

4. The method of claim 2, further comprising:
adjusting the memory request priority register based on a load-to-use distance hint from a compiler, wherein adjusting the memory request priority register comprises increasing or decreasing the first priority value based at least in part on the first load-to-use distance; and
handling the first memory access request as a non-speculative request based on decreasing the first priority value or handling the first memory access request as a speculative request based on increasing the first priority value.

5. The method of claim 2, further comprising:
adjusting the memory request priority register based on a depth of a load-store queue associated with the processing element relative to a capacity of the load-store queue.

6. The method of claim 5, wherein the processing element is a first processing element and the load-store queue is a first load-store queue, and wherein the second memory access request is received from a second processing element associated with a second load-store queue, the method further comprising:
receiving at the memory controller an indication that the second load-store queue has reached a threshold level of depth relative to a capacity of the second load-store queue; and
increasing priority values of memory access requests in the queue of the memory controller from the second processing element based on the indication.

7. The method of claim 2, further comprising:
updating a progress counter in the processing element based on a relative number of instructions executed in the processing element; and adjusting the memory request priority register based on the progress counter.

8. The method of claim 7, further comprising:
receiving a progress counter value of the progress counter at a progress monitor;
comparing the progress counter value to one or more other progress counter values received from one or more other processing elements; and
adjusting the memory request priority register of the processing element and one or more other memory request priority registers of the one or more other processing elements to increase priority for processing elements having lesser progress and decrease priority for processing elements having greater progress.

9. The method of claim 1, further comprising:
receiving the memory access request and one or more other memory access requests at the crossbar interconnect; and
arbitrating between the memory access request and the one or more other memory access requests in the crossbar interconnect based on comparing the priority value of the memory access request relative to one or more priority values of the one or more other memory access requests.

10. The method of claim 1, further comprising:
adjusting the priority values of the plurality of memory access requests stored in the queue of the memory controller based on one or more of:
a number of memory access requests in the queue from a same processing element;
a latest priority of a last arriving memory access request from the same processing element; and
an age of the memory access requests in the queue.

11. A memory device, comprising:
a processing element coupled to a crossbar interconnect, the processing element configured to send a first memory access request comprising a first priority value to the crossbar interconnect;
the crossbar interconnect configured to route the first memory access request to a memory controller associated with the first memory access request; and
the memory controller coupled to a memory and to the crossbar interconnect, the memory controller comprising a queue storing a plurality of memory access requests and configured to:
determine a first load-to-use distance between loading and using data associated with the first memory access request, wherein the first load-to-use distance is indicative of a first time that elapses between loading and using data associated with the first memory access request;
determine a second load-to-use distance between loading and using data associated with a second memory access request of a plurality of memory access requests stored in a queue of the memory controller, wherein the second load-to-use distance is indicative of a second time that elapses between loading and using data associated with the second memory access request, wherein each of the plurality of memory access requests stored in the queue is associated with a corresponding priority value of a set of priority values, and wherein the set of priority values is indicative of an order of execution of the plurality of memory access requests;
determine that the second load-to-use distance is greater than the first load-to-use distance indicating that the second time is greater than the first time;

dynamically modify a second priority value of the second memory request based at least in part on determining that the second load-to-use distance is greater than the first load-to-use distance, wherein dynamically modifying the second priority value comprises lowering the second priority value to decrease a priority of the second memory access request in the order of execution;

compare the first priority value of the memory access request to the set of priority values to determine a highest priority memory access request; and perform the highest priority memory access request.

12. The memory device of claim 11, wherein the processing element further comprises a memory request priority register, and the processing element is further configured to set the first priority value based on the memory request priority register in the processing element.

13. The memory device of claim 12, wherein the memory request priority register is adjusted based on an application code hint indicating criticality of a code section.

14. The memory device of claim 12, wherein the processing element is further configured to:

adjust the memory request priority register based on a load-to-use distance hint from a compiler, wherein adjusting the memory request priority register comprises increasing or decreasing the first priority value based at least in part on the first load-to-use distance indicated by the load-to-use distance hint; and handle the first memory access request as a non-speculative request based on decreasing the first priority value or handle the first memory access request as a speculative request based on decreasing the first priority value.

15. The memory device of claim 12, wherein the processing element is further configured to adjust the memory request priority register based on a depth of a load-store queue associated with the processing element relative to a capacity of the load-store queue.

16. The memory device of claim 15, wherein the processing element is a first processing element and the load-store queue is a first load-store queue, wherein the second memory access request is received from a second processing element associated with a second load-store queue, and wherein the memory controller is further configured to:

receive an indication that the second load-store queue has reached a threshold level of depth relative to a capacity of the second load-store queue; and increase priority values of memory access requests in the queue of the memory controller from the second processing element based on the indication.

17. The memory device of claim 12, wherein the processing element further comprises the progress counter and the processing element is further configured to:

update a progress counter in the processing element based on a relative number of instructions executed in the processing element; and adjust the memory request priority register based on the progress counter.

18. The memory device of claim 17, further comprising:

one or more other processing elements comprising one or more other memory request priority registers and one or more other progress counters; and a progress monitor coupled to the processing element and the one or more other processing elements, the progress monitor configured to:

receive a progress counter value of the progress counter and one or more other progress counter values from the one or more other progress counters;

compare the progress counter value to the one or more other progress counter values; and adjust the memory request priority register of the processing element and the one or more other memory request priority registers of the one or more other processing elements to increase priority for processing elements having lesser progress and decrease priority for processing elements having greater progress.

19. The memory device of claim 11, wherein the crossbar interconnect further comprises an arbiter, the arbiter configured to:

receive the memory access request and one or more other memory access requests; and arbitrate between the memory access request and the one or more other memory access requests based on comparing the priority value of the memory access request relative to one or more priority values of the one or more other memory access requests.

20. The memory device of claim 11, wherein the memory controller is further configured to adjust the priority values of the plurality of memory access requests stored in the queue of the memory controller based on one or more of:

a number of memory access requests in the queue from a same processing element;

a latest priority of a last arriving memory access request from the same processing element; and an age of the memory access requests in the queue.

* * * * *